(12) United States Patent
Haataja et al.

(10) Patent No.: US 6,739,795 B1
(45) Date of Patent: May 25, 2004

(54) TELESCOPING TROUGH

(75) Inventors: Timothy Jon Haataja, Prior Lake, MN (US); Brian L. Johnson, Maple Grove, MN (US); Wayne Albin Johnson, Rosemount, MN (US); Thomas Walter Kampf, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/578,300

(22) Filed: May 25, 2000

(51) Int. Cl.[7] .................................. F16L 27/00
(52) U.S. Cl. ..................... 403/387; 403/363; 248/68.1
(58) Field of Search .................. 248/59, 68.1; 403/363, 403/387

(56) References Cited

U.S. PATENT DOCUMENTS

| | | |
|---|---|---|
| 689,894 A | 12/1901 | Lutz |
| 1,986,965 A | 1/1935 | Frank |
| 1,992,574 A | 2/1935 | Jenkins |
| 2,805,401 A | 9/1957 | Crowley |
| 2,975,805 A | 3/1961 | Horn |
| 3,436,047 A * | 4/1969 | Foltz ..................... 403/363 X |
| 3,592,239 A | 7/1971 | Adler |
| 4,130,463 A | 12/1978 | Klavir |
| 4,480,859 A | 11/1984 | Rueckl et al. |
| 4,652,017 A | 3/1987 | Drechsel |
| 4,781,401 A | 11/1988 | Sharp |
| 5,067,678 A | 11/1991 | Henneberger et al. |
| 5,160,811 A | 11/1992 | Ritzmann |
| 5,161,580 A | 11/1992 | Klug |
| 5,215,338 A | 6/1993 | Kimura et al. |
| 5,240,209 A | 8/1993 | Kutsch |
| 5,271,585 A | 12/1993 | Zetena, Jr. |
| 5,316,243 A | 5/1994 | Henneberger |
| 5,316,244 A | 5/1994 | Zetena, Jr. |
| 5,335,349 A | 8/1994 | Kutsch et al. |
| 5,375,891 A | 12/1994 | Sicotte et al. |
| 5,409,266 A | 4/1995 | Baker |
| 5,503,354 A | 4/1996 | Lohf et al. |
| 5,752,781 A | 5/1998 | Haataja et al. |
| 5,803,653 A * | 9/1998 | Zuffetti ..................... 403/363 |
| 5,923,753 A | 7/1999 | Haataja et al. |
| 5,924,260 A * | 7/1999 | Austin et al. ........... 403/363 X |
| 5,937,131 A | 8/1999 | Haataja et al. |
| 5,995,699 A | 11/1999 | Vargas et al. |
| 6,037,538 A | 3/2000 | Brooks |
| 6,076,779 A | 6/2000 | Johnson |
| 6,174,231 B1 | 1/2001 | Bodin |
| 6,206,456 B1 * | 3/2001 | Steury et al. ............... 296/173 |

FOREIGN PATENT DOCUMENTS

| | | |
|---|---|---|
| DE | 1 850 468 | 4/1962 |
| DE | 37 37 187 A1 | 5/1988 |
| JP | 10-164743 | 6/1998 |
| WO | WO 89/02179 | 3/1989 |

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2×2," 2 pages, dated May 1999.
ADC Telecommunications brochure entitled "FiberGuide® Fiber Management Systems," 37 pages, dated Jun. 1998.

* cited by examiner

*Primary Examiner*—Lynne H. Browne
*Assistant Examiner*—John R. Cottingham
(74) *Attorney, Agent, or Firm*—Merchant & Gould P.C.

(57) ABSTRACT

A telescoping cable trough section is provided including first and second U-shaped trough sections which are slideably received with each other. One trough section includes slots, and the other includes flanges received in the slots for mating the two trough sections together to form the telescoping cable trough section.

43 Claims, 16 Drawing Sheets

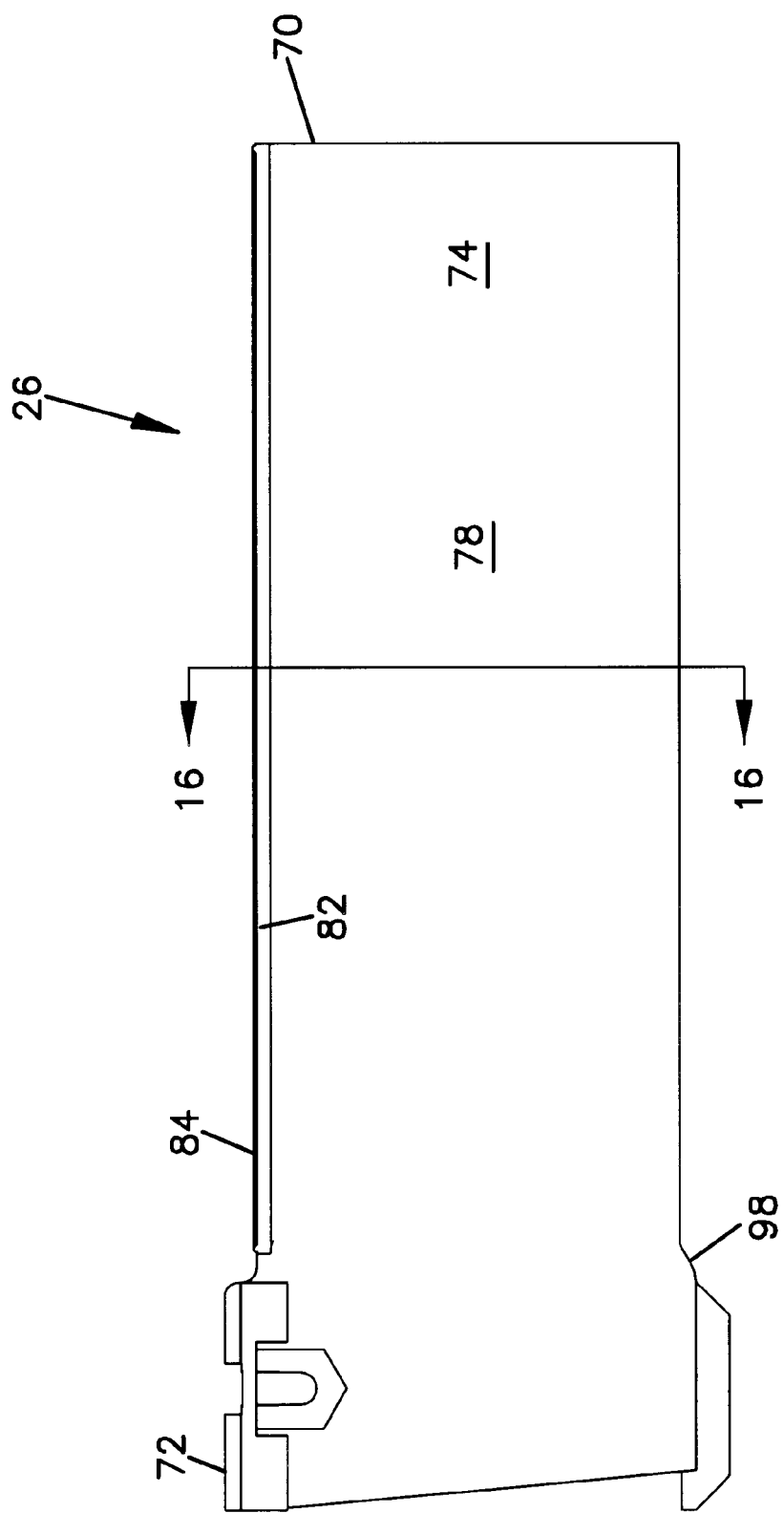

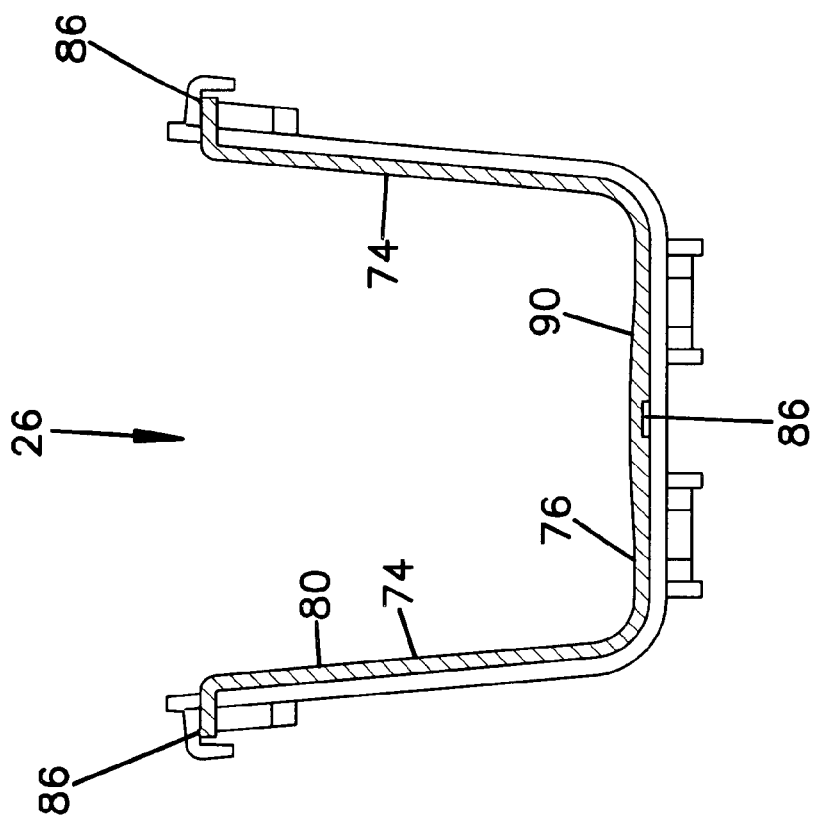

TELESCOPING TROUGH

FIELD OF THE INVENTION

This application relates to a system for the management and routing of optical fiber cables and other telecommunications cables. Particularly, this application relates to a trough member for use with other troughs, couplings, and fittings.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6–7 of the '678 patent, a plurality of hardware is disclosed for joining the trough members. U.S. Pat. Nos. 5,316,243 and 5,752,781 show additional examples of couplings.

Several concerns arise with cable routing systems, including the ease of installation of the troughs, couplings, and fittings. A further concern is removing components at a later date, such as to substitute different functional elements into the system. Rigid systems provide adequate fiber support and protection. However, such prior art systems can be somewhat difficult to install, and modify later.

SUMMARY OF THE INVENTION

The present invention relates to a telescoping cable trough section for a cable routing system. The cable trough section includes first and second U-shaped trough sections extending in a longitudinal direction and each including a terminal end and a receiving end. The receiving ends are slideably mated for sliding movement along the longitudinal direction. The terminal ends can be joined to other system components, including couplings for joining to other trough sections or fittings in the cable routing system.

Preferably, the terminal ends of the first and second trough sections include ends shaped to mate with the same coupling. Preferably, the terminal ends define the same coupling profile.

In one preferred embodiment, each of the first and second trough sections includes two upright walls. One of the first and second trough sections includes longitudinal slots formed in the upright walls. The other of the first and second trough sections includes longitudinal flanges on the upright walls which are slideably received in the longitudinal slots of the other trough section.

In one preferred embodiment, a retention system retains the first and second trough sections together so that the parts do not slide apart before installation in the system.

BRIEF DESCRIPTION OF THE DRAWINGS

FIG. 15 is a side view of the second trough section;

FIG. 16 is a cross-sectional end view of the second trough section, taken along lines 16—16 of FIG. 15.

DETAILED DESCRIPTION OF THE PREFERRED EMBODIMENT

Figure 1:
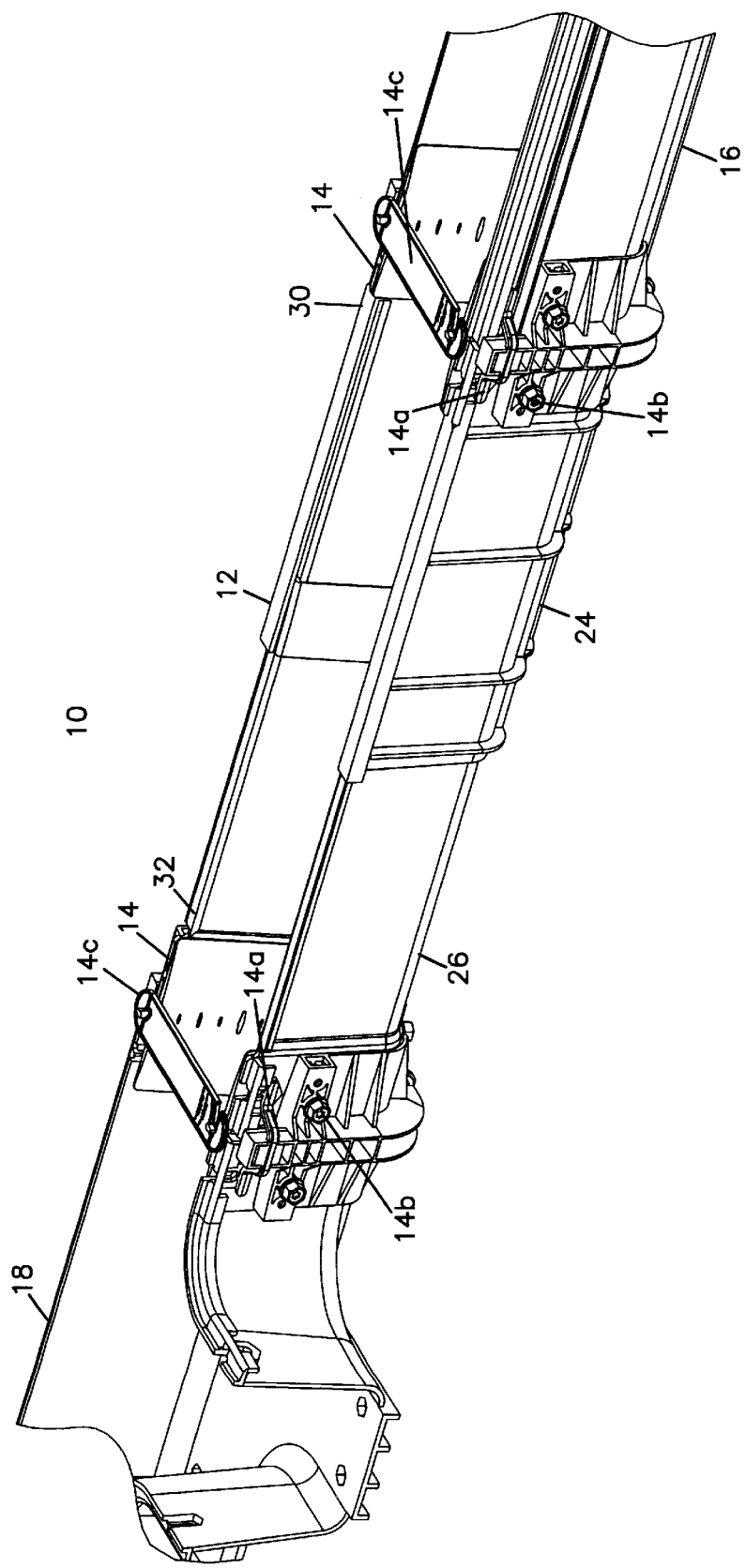
FIG. 1 is a top perspective view of a portion of a cable routing system, including a telescoping trough in accordance with the present invention, and a horizontal trough section, and a fitting as exemplary components used with the telescoping trough.
Figure 2:
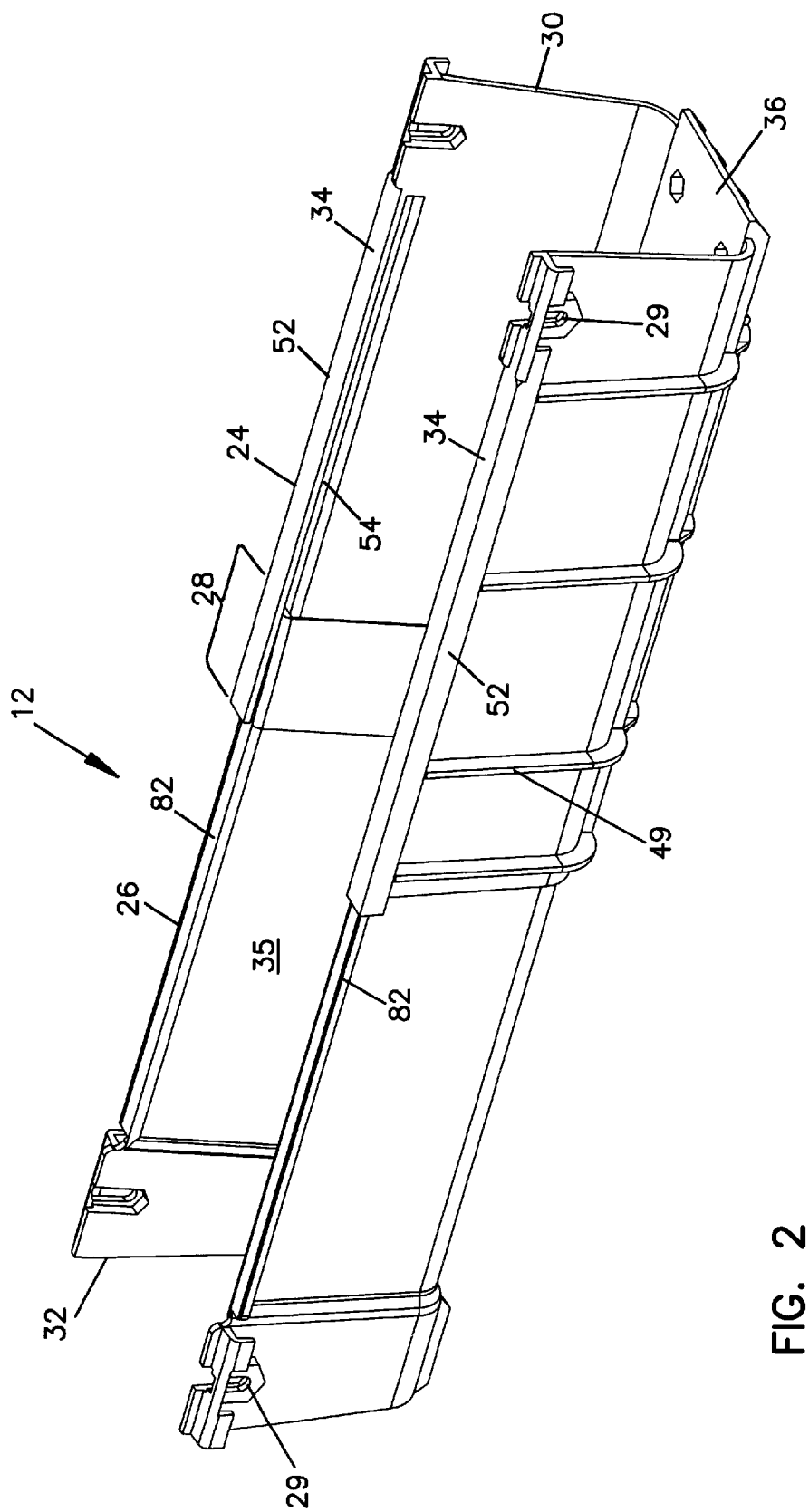
FIG. 2 is a top perspective view of the telescoping trough of FIG. 1.
Figure 3:
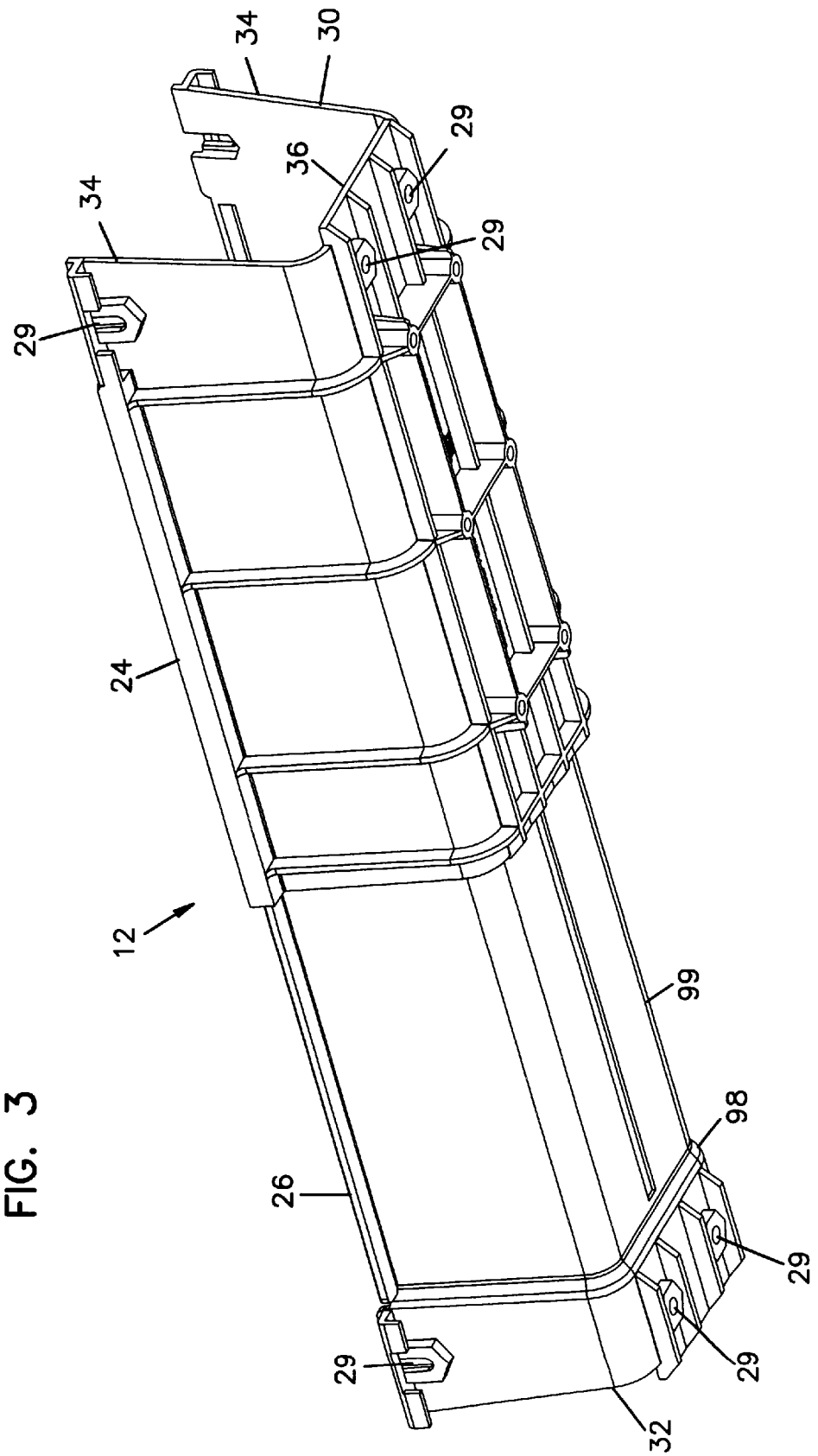
FIG. 3 is a bottom perspective view of the telescoping trough.
Figure 4:
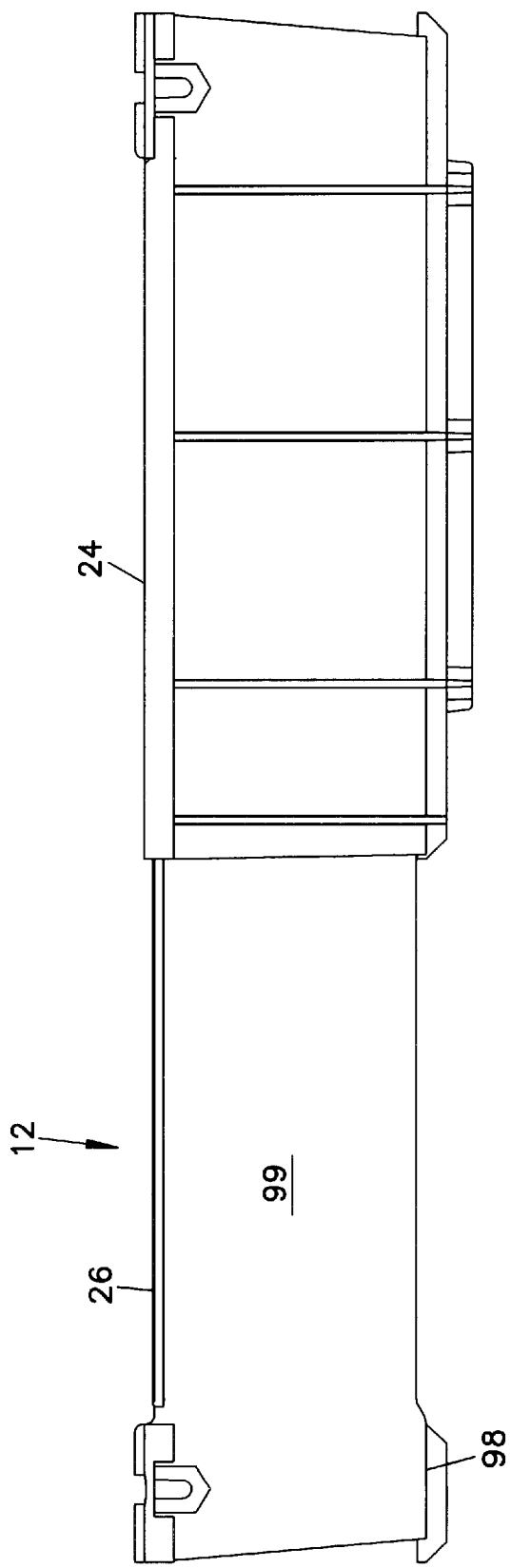
FIG. 4 is a side view of the telescoping trough.

Referring now to FIG. 1, a cable routing system 10 is shown in accordance with the principals of the present invention. Cable routing system 10 includes a telescoping trough 12 mounted to a coupling 14 on one terminal end 30. Coupling 14 joins telescoping trough 12 to horizontal trough section 16. An opposite terminal end 32 of telescoping trough 12 is mounted to a second coupling 14 which is mounted to a fitting 18 (T-fitting). End 30 can be spaced from end 32 in a telescoping manner.

Couplings 14 are described in greater detail in U.S. Pat. No. 5,752,781, the disclosure of which is incorporated by reference. Terminal ends 30, 32 are received in generally U-shaped channels in couplings 14. Resilient tabs 14a engage holes 29 in terminal ends 30,32. Fasteners 14b of coupling 14 are screwed down to secure couplings 14 to trough 12. Cable retention members 14c are added to help retain the cables in the various trough and fitting components. Additional couplings, troughs and fittings useful in system 10 with trough 12 are disclosed in U.S. Pat. Nos. 5,067,678; 5,316,243; 5,923,753 and 5,937,131, the disclosures of which are also incorporated by reference.

Telescoping trough 12 has a variable or changeable length so as to be usable in a variety of circumstances in system 10 or other systems. Trough 12 is useful in system 10 where the distance between couplings 14 is any distance between a maximum and minimum for the amount of extension for telescoping trough 12. This allows for less precise design and assembly of system 10. Instead of telescoping trough 12, a single piece trough would have to be custom cut or manufactured to fit between couplings 14.

Because the length of telescoping trough 12 is variable, telescoping trough 12 can drop into position between couplings 14, in a slightly retracted state, and then be expanded to complete the cable pathway between couplings 14. Once expanded, resilient tabs 14a, and fasteners 14b secure trough 12 in place. Further, system 10 can be accessed for modification by releasing tabs 14a, and fasteners 14b, and then retracting telescoping trough 12 to allow its removal.

Figure 5:
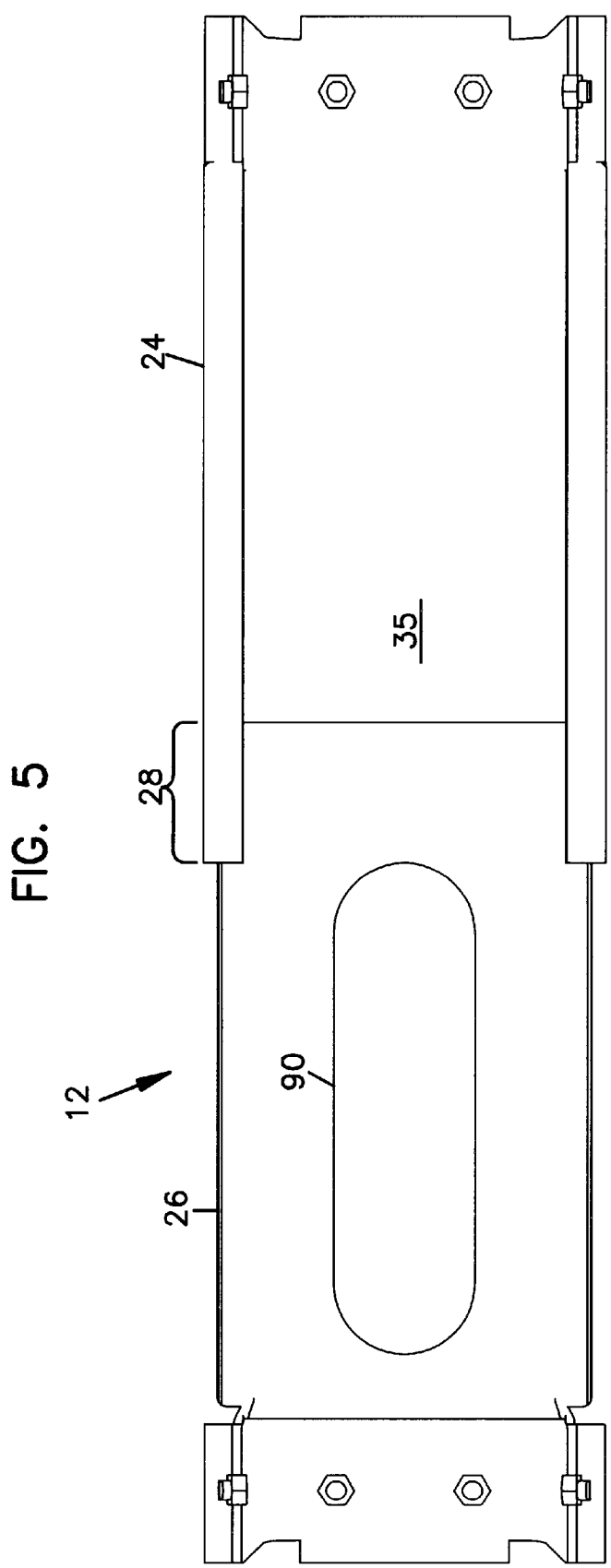
FIG. 5 is a top view of the telescoping trough.
Figure 6:
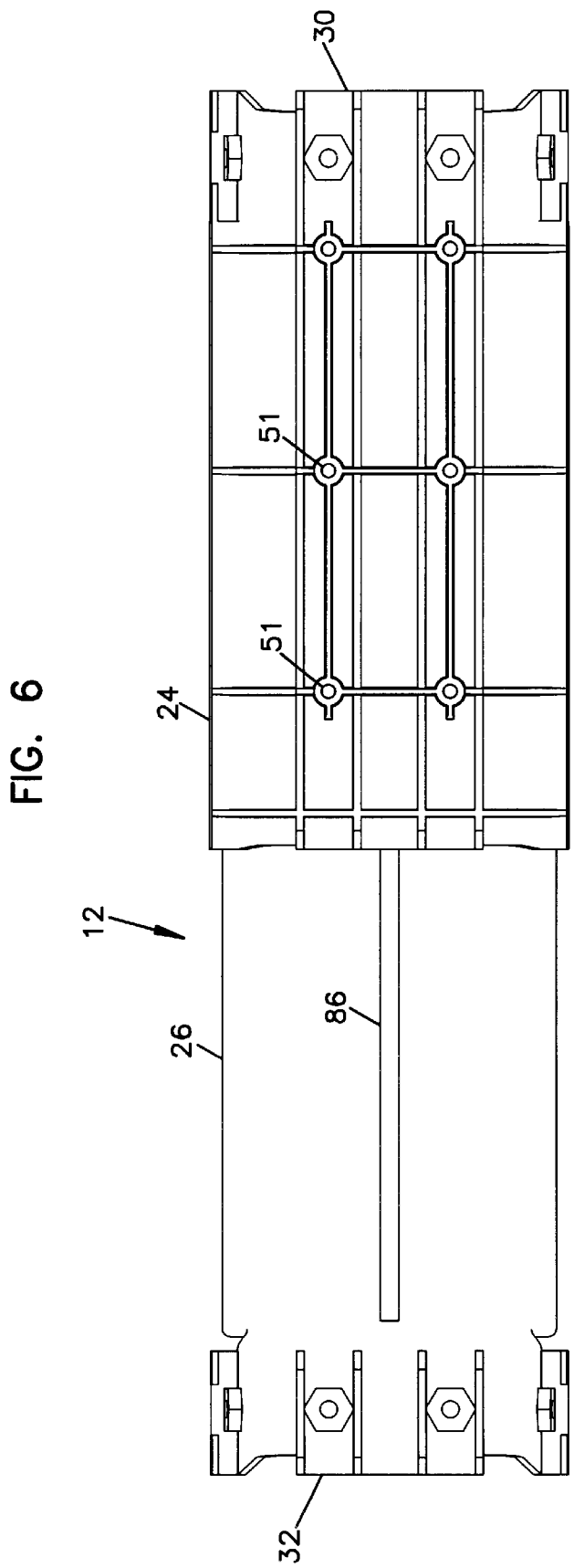
FIG. 6 is a bottom view of the telescoping trough.
Figure 7:
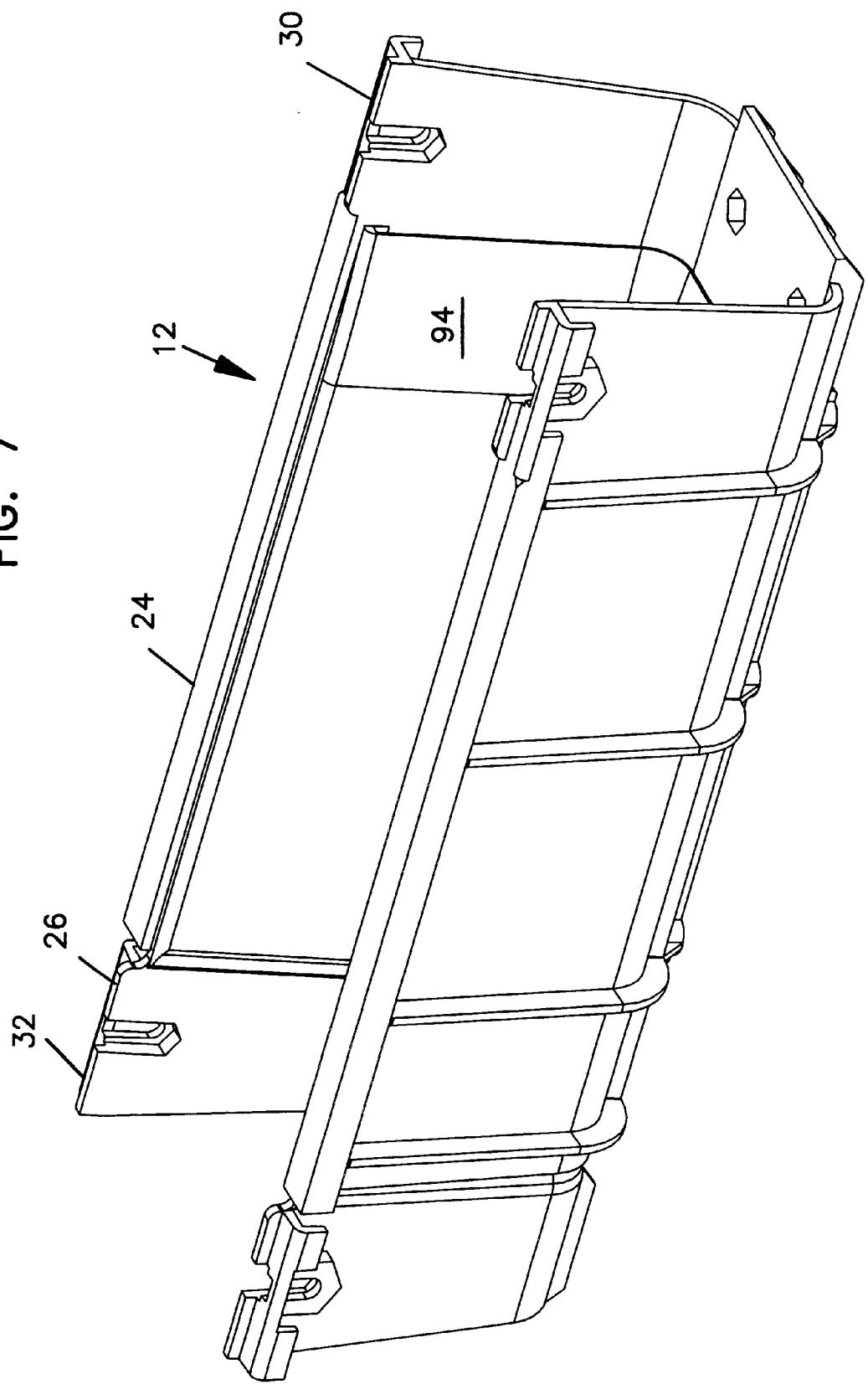
FIG. 7 is a top perspective view of the telescoping trough in a retracted state.
Figure 8:
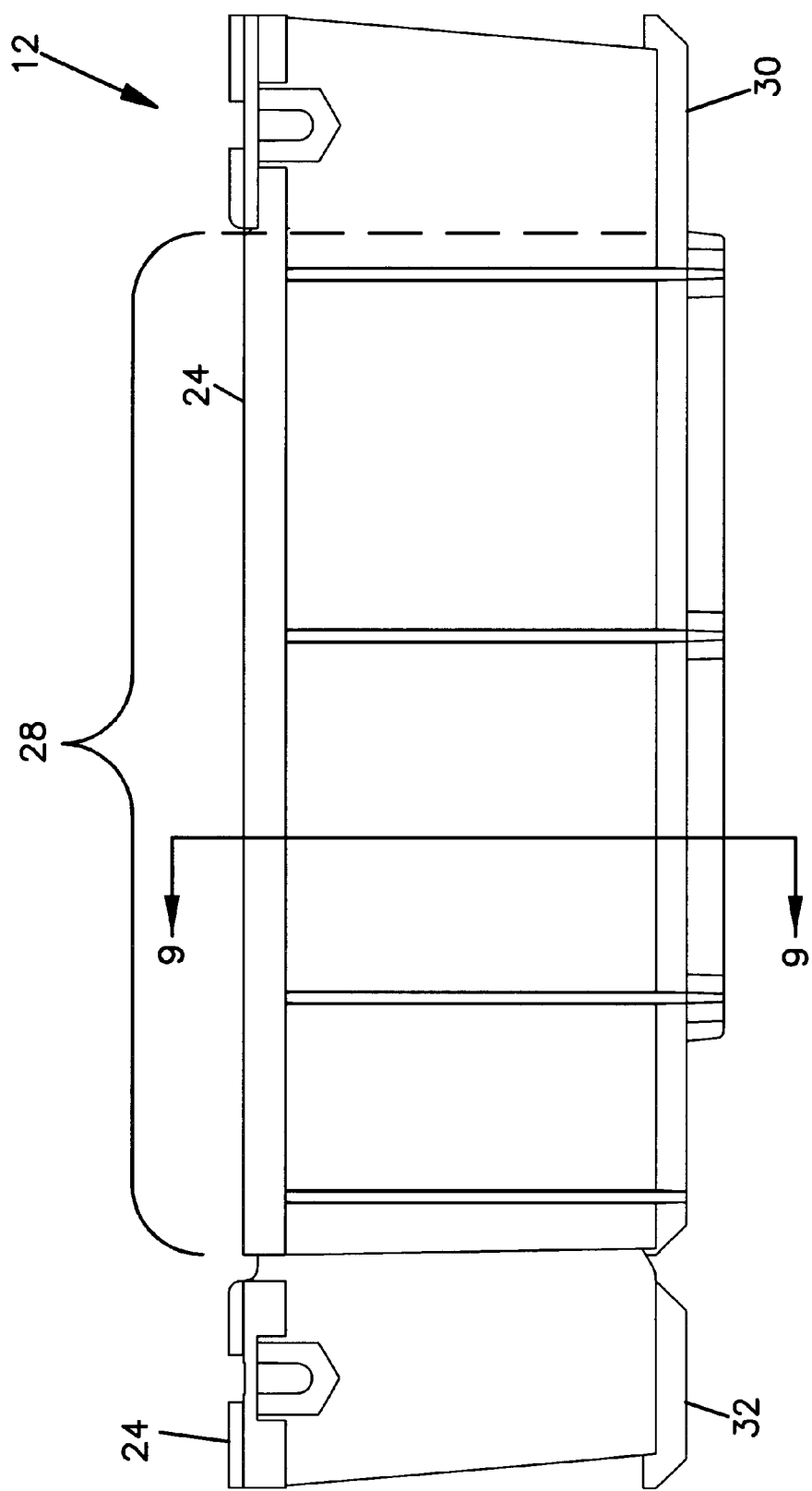
FIG. 8 is a side view of the telescoping trough of FIG. 7.

Telescoping trough 12 includes a first trough section 24 and a second trough section 26 which are slideably mated with one another. First trough section 24 and second trough section 26 include a variable overlap portion 28 (compare FIGS. 5 and 8). Terminal ends 30, 32 of telescoping trough 12 each join to one of couplings 14. Terminal ends 30, 32 each have a profile which permits either end 30, 32 to be mated with either coupling 14. Such a shaping for the ends allows ease of assembly since trough 12 can be inserted in either orientation for ends 30, 32. Preferably, the end profiles of trough 12 are identical. Terminal ends 30, 32 also mate with other couplings or fittings as desired.

Telescoping trough 12 defines a generally U-shaped channel with upright walls 34 extending from a base wall 36. Interior 35 defines the cable pathway for the optical fiber (or copper) cables.

First trough section 24 includes a receiving end 40, and an opposite terminal end 42. First trough section 24 defines a generally U-shaped channel including upright wall sections 44 extending from a base wall section 46. First trough section 24 includes an outside surface 48 and an inside surface 50. Outside surface 48 can include a variety of shapes including strengthening ribs 49 and structure 51 for mounting to system support hardware which holds system 10 in place, such as in a ceiling mount.

First trough section 24 includes upper flanges 52 at an upper portion of upright wall sections 44 each defining a slot 54 for mating with portions of second trough section 26, as will be described below in further detail. Base wall section 46 further includes a projecting tab 56 facing upwardly. Tab 56 includes a ramp surface 58, and a shoulder 60. Tab 56 is used to retain first and second trough sections 24, 26 together, as will be described below in further detail.

Second trough section 26 includes a receiving end 70, and an opposite terminal end 72. Upright wall sections 74 extend from base wall section 76. Second trough section 26 includes an outside surface 78 and an inside surface 80. At an upper portion of upright wall sections 74, upper flanges 82 extend outwardly for receipt in slots 54 of first trough section 24. In the mated state, inside surface 50 of first trough section 24 closely receives outside surface 78 of second trough section 26. Inside surface 80 and the exposed inside surface 50 not covered by second trough section 26, form a closed U-shaped trough for receipt of the cables passing through trough 12.

Flanges 82 each include small upper ridges 84 extending perpendicularly to flanges 82 to assist with a secure fit of flanges 82 in slots 54. Ridges 84 help fill the height of slots 54, yet do not promote binding of the parts during sliding movement (see FIG. 9).

Figure 9:
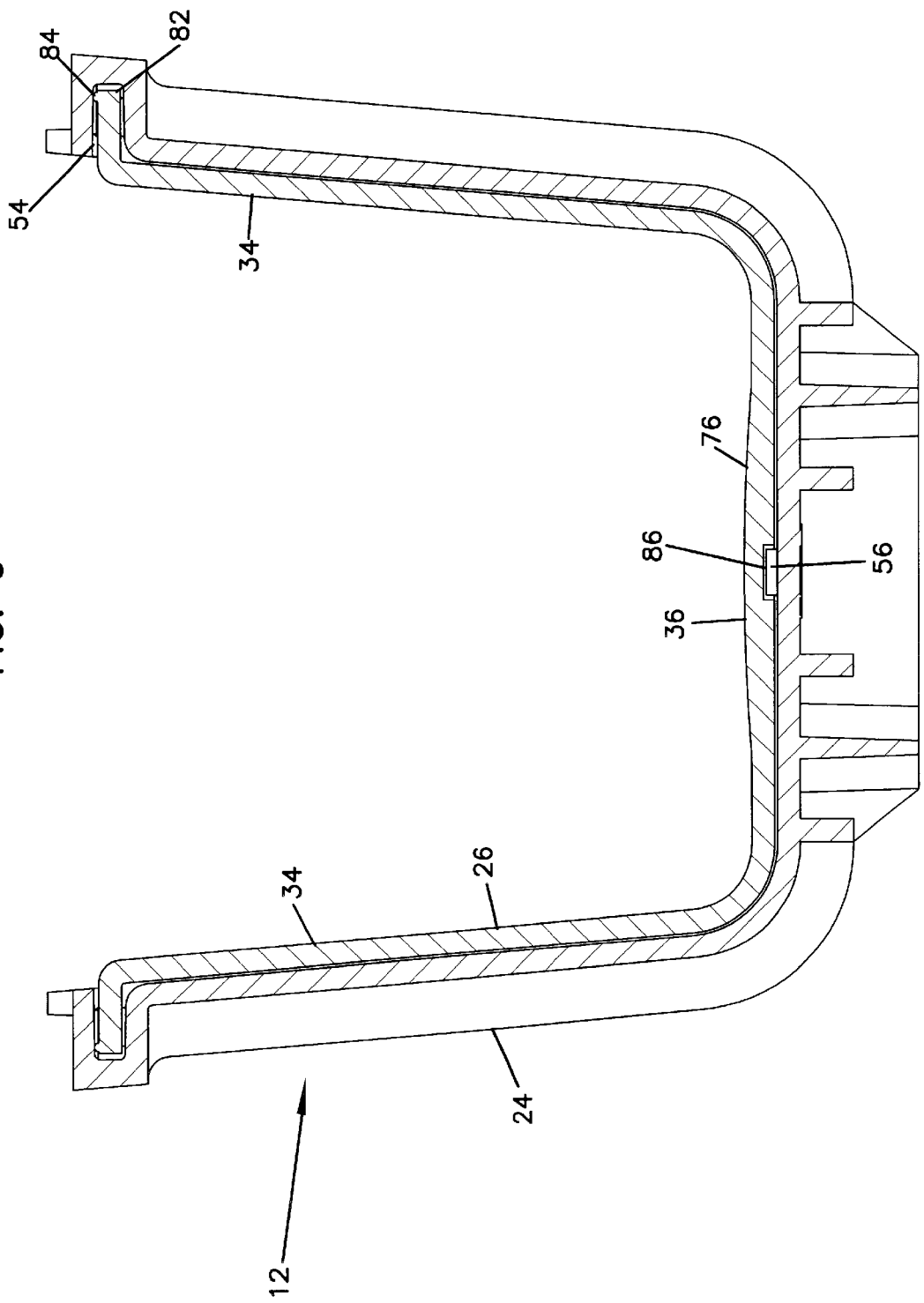
FIG. 9 is a cross-sectional end view of the telescoping trough, taken along lines 9—9 of FIG. 8.
Figure 10:
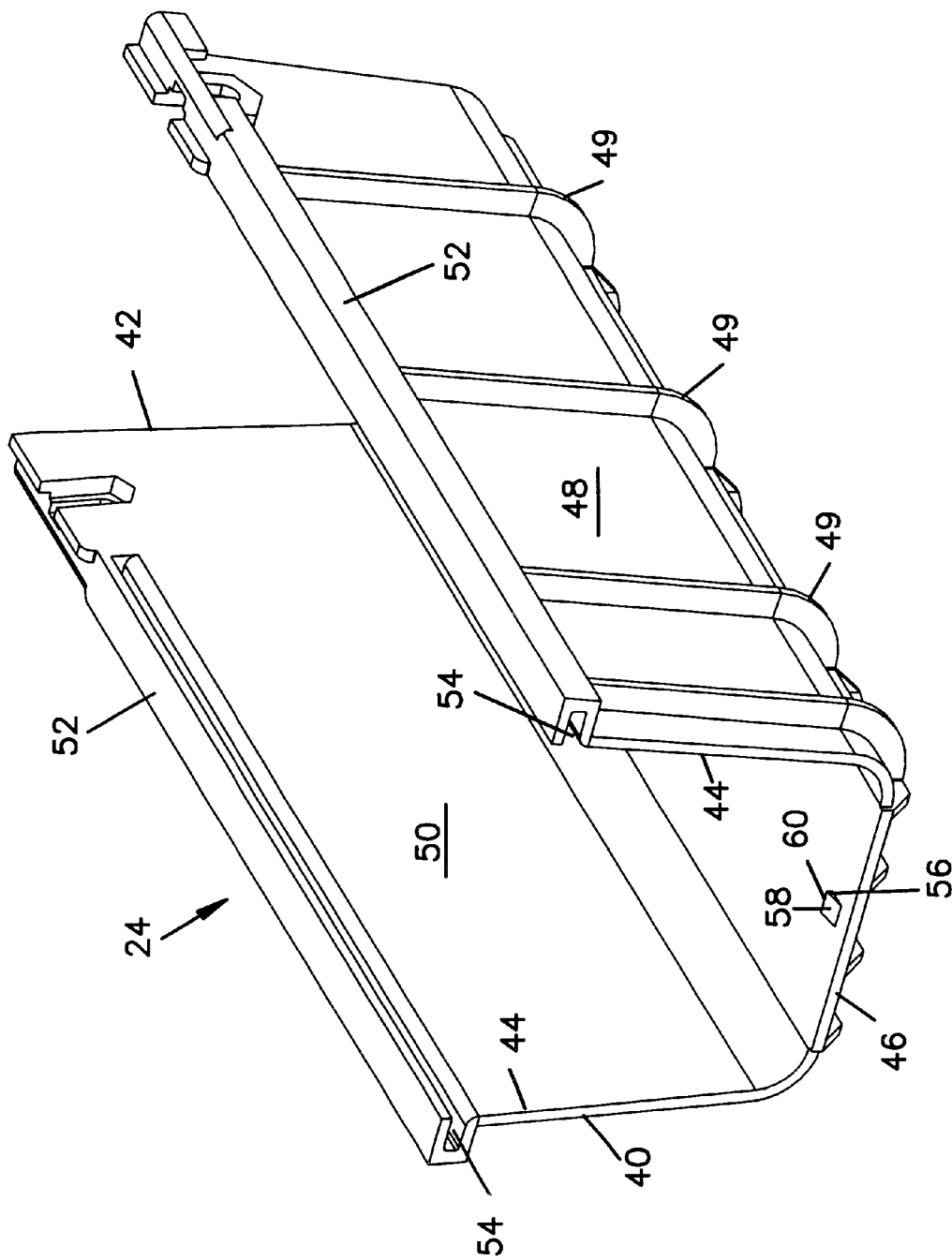
FIG. 10 is a top perspective view of the first trough section of the telescoping trough.
Figure 11:
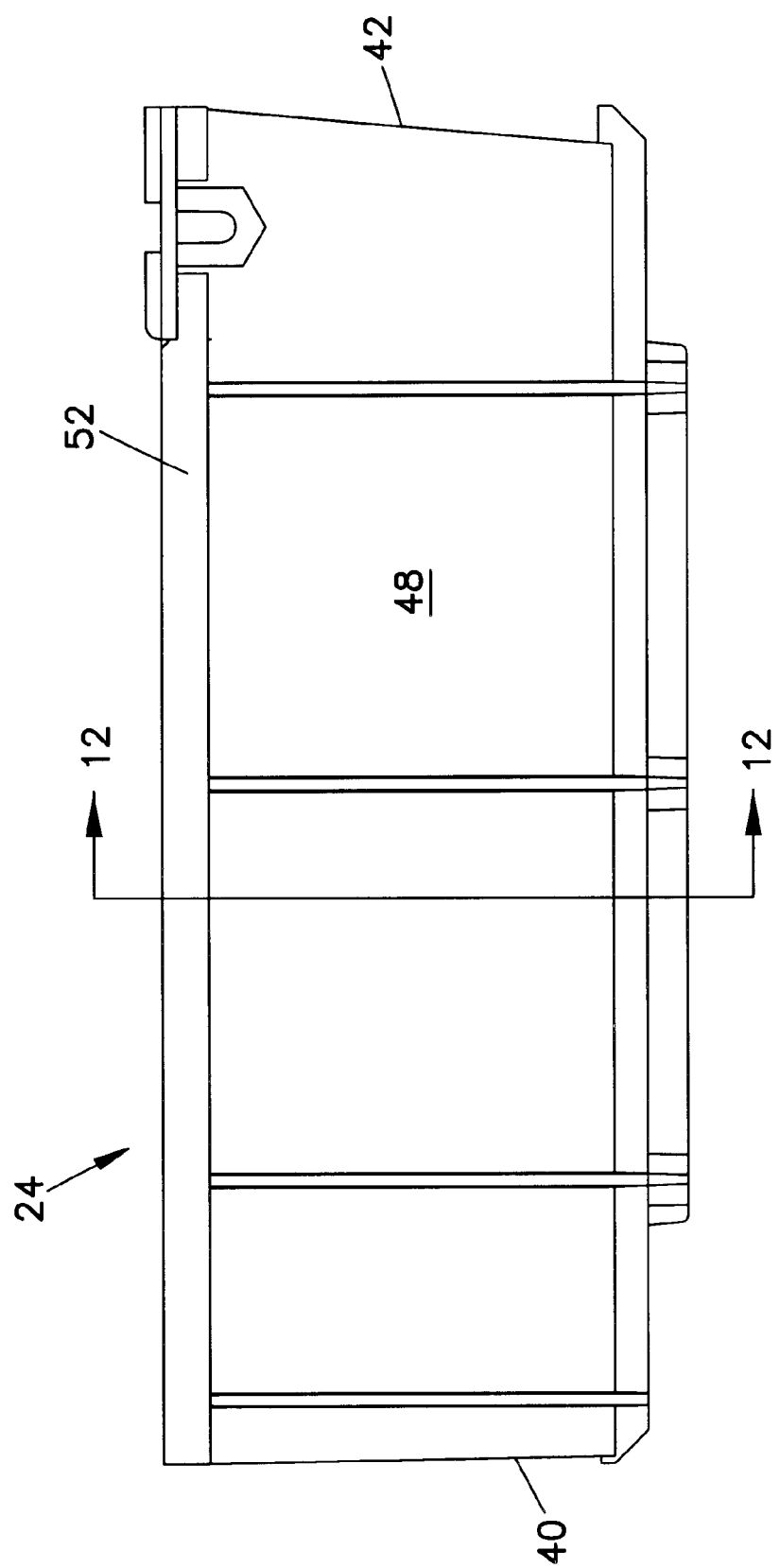
FIG. 11 is a side view of the first trough section.
Figure 12:
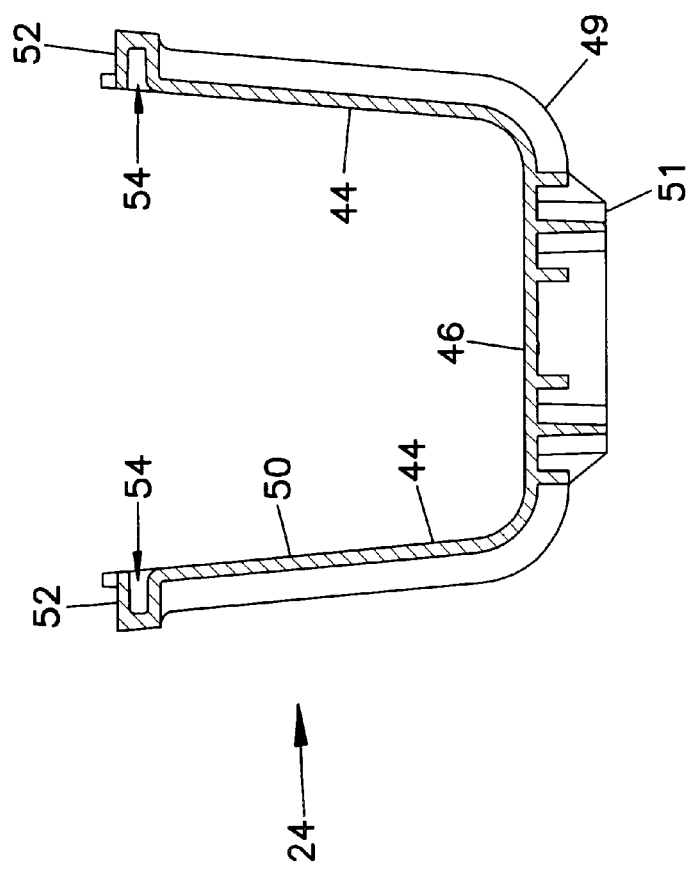
FIG. 12 is a cross-sectional end view of the telescoping trough, taken along lines 12—12 of FIG. 11.
Figure 13:
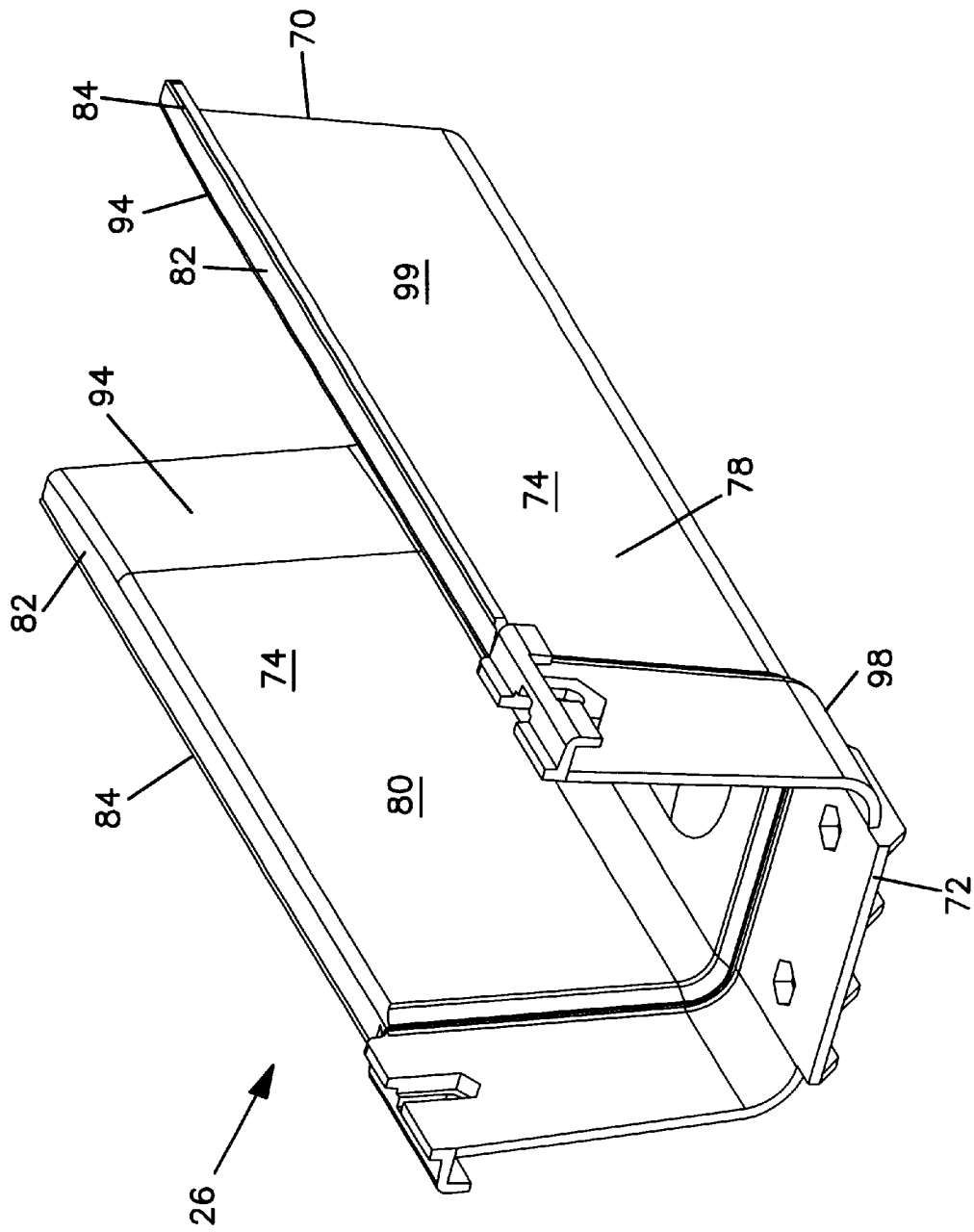
FIG. 13 is a top perspective view of the second trough section of the telescoping trough.
Figure 14:
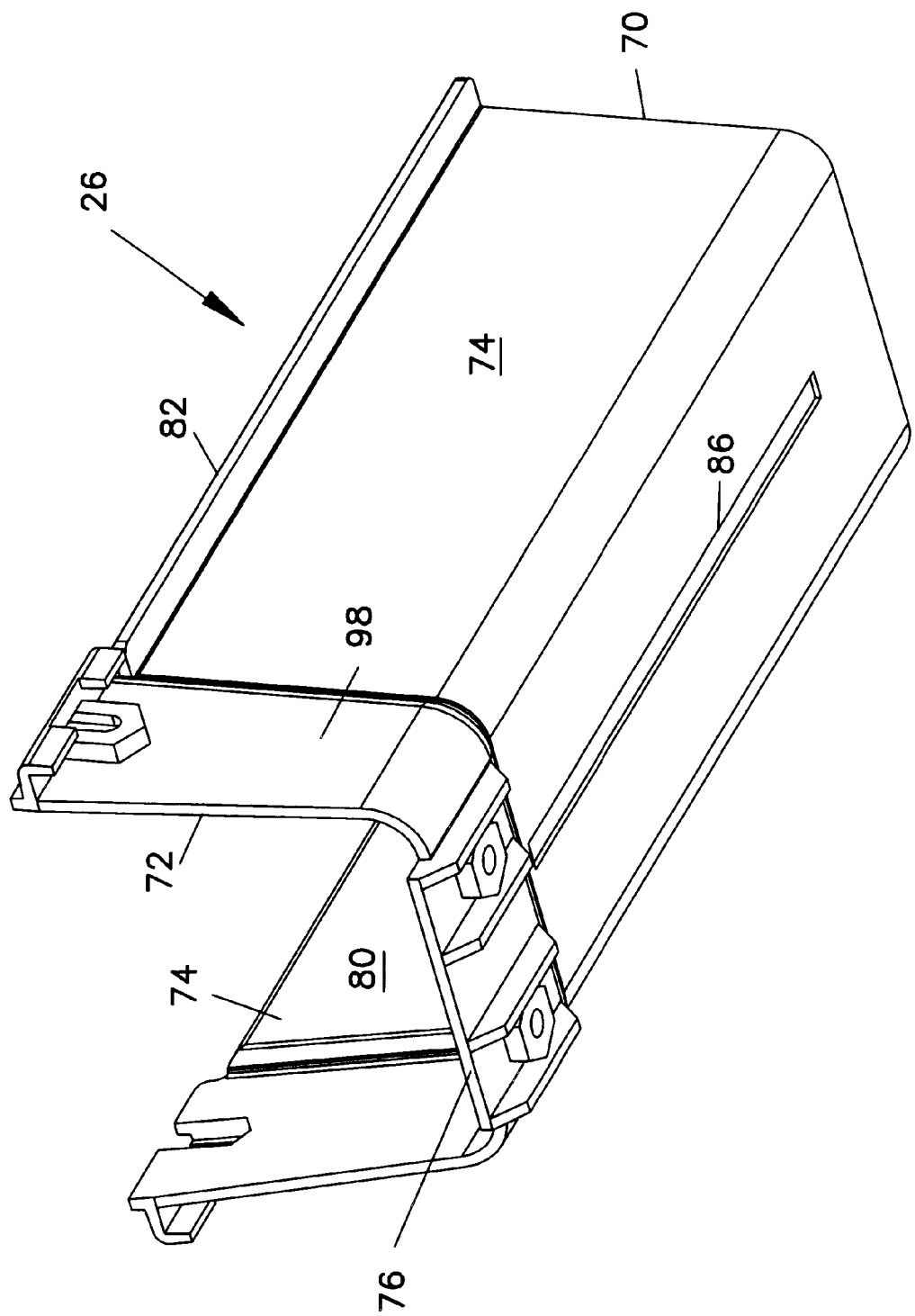
FIG. 14 is a bottom perspective view of the second trough section.

Base wall section 76 of second trough section 26 includes an elongated slot 86 for receipt of tab 56 of first trough section 24 (see FIG. 9). The interaction of tab 56 and slot 86 keeps second trough section 26 from being separated from first trough section 24 and further defines the maximum length of trough 12. Ramp surface 58 allows for the two trough sections 24, 26 to be mounted together during assembly by aligning the two parts (receiving end 70 inside receiving end 40, and flanges 82 aligned with slots 54) and pressing them together in the axial direction. Once tab 56 is positioned in slot 86, shoulder 60 prevents the two pieces from being separated. Preferably first and second trough sections 24, 26 are made from molded plastic. Tab 56 can be separated from slot 86 by manually pressing base wall section 46 away from base wall section 76.

Base wall section 76 of second trough section 26 preferably includes a middle thickened area 90, which allows for convenient molding from plastic. Middle thickened area 90 provides an increased thickness in portions of second trough section 26 adjacent to slot 86. Thickened area 90 promotes material flow during molding. Receiving end 70 of second trough section 26 preferably includes a tapered receiving end 94, to help protect fiber optic cables contained within telescoping trough 12 from contacting any sharp edges. End 94 tapers to a minimum wall thickness at end 70. Second trough section 26 further includes an enlarged terminal end 98 relative to a reduced central section 99 and receiving end 70 which allows for terminal end 72 to have a similar coupling profile as terminal end 42 of first trough section 24. Enlarged terminal end 98 also provides a stop for limiting the minimum length of trough 12.

The above specification, examples and data provide a complete description of the manufacture and use of the invention. Since many embodiments of the invention can be made without departing from the spirit and scope of the invention, the invention resides in the claims hereinafter appended.

What is claimed is:

1. A telescoping cable trough section comprising:

a first U-shaped trough section, with an open top extending the entire length of the second through section, extending in a longitudinal direction and including a terminal end and an opposite receiving end;

a second U-shaped trough section, with an open top extending the entire length of the second through section, extending in a longitudinal direction and including a terminal end and an opposite receiving end;

the receiving end of the second trough section slideably mated with the receiving end of the first trough section for sliding movement along the longitudinal direction;

wherein the terminal ends of the first and second trough sections define the same coupling profile for connecting to a coupling member on either terminal end, wherein the same coupling profile has substantially the same dimensions for coupling so the terminal ends can be reversed.

2. The cable trough section of claim 1, wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section.

3. The cable trough section of claim 2, wherein the flanges include perpendicularly extending ridges.

4. The cable trough section of claim 1, wherein the receiving end of the second trough section includes a tapered surface.

5. The cable trough section of claim 1, further comprising a tab and a longitudinal slot connection between the first and second trough sections which prevents the first and second trough sections from being separated longitudinally.

6. The cable trough section of claim 1, wherein the terminal end of the second trough section includes an enlarged section adjacent to the terminal end and a reduced central section extending to the receiving end, the receiving end positioned inside the receiving end of the first trough section.

7. A telescoping cable trough section comprising:
a first U-shaped trough section extending in a longitudinal direction and including a terminal end and an opposite receiving end;
a second U-shaped trough section extending in a longitudinal direction and including a terminal end and an opposite receiving end;
the receiving end of the second trough section slideably mated with the receiving end of the first trough section for sliding movement along the longitudinal direction;
wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section; and
a tab and a longitudinal slot connection between the first and second trough sections which prevents the first and second trough sections from being separated longitudinally.

8. The cable trough section of claim 7, wherein the flanges include perpendicularly extending ridges.

9. The cable trough section of claim 7, wherein the receiving end of the second trough section includes a tapered surface.

10. The cable trough section of claim 7, wherein the terminal end of the second trough section includes an enlarged section adjacent to the terminal end and a reduced central section extending to the receiving end, the receiving end positioned inside the receiving end of the first trough section.

11. A telescoping cable trough section comprising:
a first U-shaped trough section extending in a longitudinal direction and including a terminal end and an opposite receiving end;
a second U-shaped trough section extending in a longitudinal direction and including a terminal end and an opposite receiving end;
the receiving end of the second trough section slideably mated with the receiving end of the first trough section for sliding movement along the longitudinal direction;
wherein the first and second trough sections include upright walls, wherein the cable trough section defines outwardly extending flanges adjacent to the tops of the upright walls of the first and second trough sections, the flanges extending away from each other in opposite directions.

12. A telescoping cable trough section comprising:
a first trough section, with an open top extending the entire length of the first through section, including a terminal end and an opposite receiving end;
a second trough section, with an open top extending the entire length of the second through section, including a terminal end and an opposite receiving end;
the receiving end of the second trough section slideably engaged with the receiving end of the first trough section for sliding telescoping movement with the first trough section;
wherein the terminal ends of the first and second trough sections define the same coupling profile for connecting to a coupling member on either terminal end, wherein the same coupling profile has substantially the same dimensions for coupling so the terminal ends can be reversed.

13. The cable trough section of claim 12, wherein the first and second trough sections include upright walls, wherein the first trough section includes slots formed in the upright walls, and wherein the second trough section includes flanges on the upright walls of the second trough section which are slideably received in the slots of the first trough section.

14. The cable trough section of claim 13, wherein the flanges include perpendicularly extending ridges.

15. The cable trough section of claim 12, wherein the receiving end of the second trough section includes a tapered surface.

16. The cable trough section of claim 12, further comprising a tab and a slot connection between the first and second trough sections which prevents the first and second trough sections from being separated.

17. The cable trough section of claim 12, wherein the terminal end of the second trough section includes an enlarged section adjacent to the terminal end and a reduced central section extending to the receiving end, the receiving end positioned inside the receiving end of the first trough section.

18. A telescoping cable trough section comprising:
a first trough section including a terminal end and an opposite receiving end;
a second trough section including a terminal end and an opposite receiving end;
the receiving end of the second trough section slideably engaged with the receiving end of the first trough section for sliding telescoping movement with the first trough section;
wherein the first and second trough sections include upright walls, wherein the first trough section includes slots formed in the upright walls, and wherein the second trough section includes flanges on the upright walls of the second trough section which are slideably received in the slots of the first trough section; and
a tab and longitudinal slot connection between the first and second trough sections which prevents the first and second trough sections from being separated.

19. The cable trough section of claim 18, wherein the flanges include perpendicularly extending ridges.

20. The cable trough section of claim 18, wherein the receiving end of the second trough section includes a tapered surface.

21. The cable trough section of claim 18, wherein the terminal end of the second trough section includes an enlarged section adjacent to the terminal end and a reduced central section extending to the receiving end, the receiving end positioned inside the receiving end of the first trough section.

22. A telescoping cable trough section comprising:
a first trough section including a terminal end and an opposite receiving end;
a second trough section including a terminal end and an opposite receiving end;

the receiving end of the second trough section slideably engaged with the receiving end of the first trough section for sliding telescoping movement with the first trough section;

wherein the first and second trough sections include upright walls, wherein the cable trough section defines outwardly extending flanges adjacent to the tops of the upright walls of the first and second trough sections, the flanges extending away from each other in opposite directions.

23. The cable trough section of claim 1, wherein the longitudinal direction of the sliding movement is straight.

24. The cable trough section of claim 23, wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section.

25. The cable trough section of claim 24, wherein the receiving end of the second trough section includes a tapered surface.

26. The cable trough section of claim 24, further comprising a tab and a longitudinal slot connection between the first and second trough sections which prevents the first and second trough sections from being separated longitudinally.

27. The cable trough section of claim 24, wherein the terminal end of the second trough section includes an enlarged section adjacent to the terminal end and a reduced central section extending to the receiving end, the receiving end positioned inside the receiving end of the first trough section.

28. The cable trough section of claim 7, wherein the longitudinal direction of the sliding movement is straight.

29. The cable trough section of claim 11, wherein the longitudinal direction of the sliding movement is straight.

30. The cable trough section of claim 4 further comprising a tab and longitudinal slot connection between the first and second trough sections which prevents the first and second trough sections from being separated longitudinally.

31. A telescoping cable trough section comprising:

a first U-shaped trough section extending in a longitudinal direction and including a terminal end and an opposite receiving end;

a second U-shaped trough section extending in a longitudinal direction and including a terminal end and an opposite receiving end;

the receiving end of the second trough section slideably mated with the receiving end of the first trough section for sliding movement along the longitudinal direction;

wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section; and wherein the flanges include perpendicularly extending ridges.

32. The telescoping trough section of claim 31, wherein the receiving end of the second trough section includes a tapered surface.

33. The telescoping trough section of claim 32 wherein the terminal ends of the first and second trough sections define the same coupling profile for connecting to a coupling member on either terminal end.

34. A telescoping cable trough section comprising:

a first U-shaped trough section extending in a longitudinal direction and including a terminal end and an opposite receiving end;

a second U-shaped trough section extending in a longitudinal direction and including a terminal end and an opposite receiving end;

the receiving end of the second trough section slideably mated with the receiving end of the first trough section for sliding movement along the longitudinal direction;

wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section; and wherein the receiving end of the second trough section includes an interior tapered surface extending from a narrow edge of the receiving end in a direction toward the terminal end that is thicker than the edge.

35. The cable trough section of claim 34 wherein the terminal end of the second trough section includes an enlarged section adjacent to the terminal end and a reduced central section extending to the receiving end, the receiving end positioned inside the receiving end of the first trough section.

36. A telescoping cable trough section comprising:

a first U-shaped trough section extending in a longitudinal direction and including a terminal end and an opposite receiving end;

a second U-shaped trough section extending in a longitudinal direction and including a terminal end and an opposite receiving end;

the receiving end of the second trough section slideably mated with the receiving end of the first trough section for sliding movement along the longitudinal direction;

wherein the first and second trough sections include upright walls, wherein the first trough section includes longitudinal slots formed in the upright walls, and wherein the second trough section includes longitudinal flanges on the upright walls of the second trough section which are slideably received in the longitudinal slots of the first trough section; and wherein the terminal end of the second trough section includes an enlarged section adjacent to the terminal end and a reduced central section extending to the receiving end, the receiving end positioned inside the receiving end of the first trough section, the enlarged section defining three interconnected portions and having a U-shape, wherein the enlarged section has a larger outer perimeter relative to the reduced central section.

37. A telescoping cable trough section comprising:

a first trough section including a terminal end and an opposite receiving end;

a second trough section including a terminal end and an opposite receiving end;

the receiving end of the second trough section slideably engaged with the receiving end of the first trough section for sliding telescoping movement with the first trough section;

wherein the first and second trough sections include upright walls, wherein the first trough section includes slots formed in the upright walls, and wherein the second trough section includes flanges on the upright walls of the second trough section which are slideably received in the slots of the first trough section; and wherein the flanges include perpendicularly extending ridges.

38. The telescoping cable trough section of claim 37 wherein the receiving end of the second trough section includes a tapered surface.

39. The telescoping cable trough section of claim 38 wherein the terminal ends of the first and second trough sections define the same coupling profile for connecting to a coupling member on either terminal end.

40. A telescoping cable trough section comprising:

a first trough section including a terminal end and an opposite receiving end;

a second trough section including a terminal end and an opposite receiving end;

the receiving end of the second trough section slideably engaged with the receiving end of the first trough section for sliding telescoping movement with the first trough section;

wherein the first and second trough sections include upright walls, wherein the first trough section includes slots formed in the upright walls, and wherein the second trough section includes flanges on the upright walls of the second trough section which are slideably received in the slots of the first trough section; and wherein the receiving end of the second trough section includes an interior tapered surface extending from a narrow edge of the receiving end in a direction toward the terminal end that is thicker than the edge.

41. The telescoping trough section of claim 40 further comprising a tab and longitudinal slot connection between the first and second trough sections which prevents the first and second trough sections from being separated.

42. A telescoping cable trough section comprising:

a first trough section including a terminal end and an opposite receiving end;

a second trough section including a terminal end and an opposite receiving end;

the receiving end of the second trough section slideably engaged with the receiving end of the first trough section for sliding telescoping movement with the first trough section;

wherein the first and second trough sections include upright walls, wherein the first trough section includes slots formed in the upright walls, and wherein the second trough section includes flanges on the upright walls of the second trough section which are slideably received in the slots of the first trough section; and wherein the terminal end of the second trough section includes an enlarged section adjacent to the terminal end and a reduced central section extending to the receiving end, the receiving end positioned inside the receiving end of the first trough section, the enlarged section defining three interconnected portions and having a U-shape, wherein the enlarged section has a larger outer perimeter relative to the reduced central section.

43. The cable trough section of claim 42 wherein the terminal ends of the first and second trough sections include outwardly extending flanges along a top portion of the upright walls.

* * * * *

UNITED STATES PATENT AND TRADEMARK OFFICE
CERTIFICATE OF CORRECTION

PATENT NO. : 6,739,795 B1
DATED : May 25, 2004
INVENTOR(S) : Haataja et al.

It is certified that error appears in the above-identified patent and that said Letters Patent is hereby corrected as shown below:

Column 4,
Line 40 "length of the second through" should read -- length of the first trough --
Line 44, "length of the second through" should read -- length of the second trough --

Signed and Sealed this

Fourteenth Day of December, 2004

JON W. DUDAS
*Director of the United States Patent and Trademark Office*